(12) United States Patent
Motil et al.

(10) Patent No.: US 8,713,666 B2
(45) Date of Patent: Apr. 29, 2014

(54) METHODS AND DEVICES FOR ENFORCING NETWORK ACCESS CONTROL UTILIZING SECURE PACKET TAGGING

(75) Inventors: Kirill Motil, Petach Tikva (IL); Almog Cohen, Petach Tikva (IL); Yaron Sheffer, Tel Aviv (IL)

(73) Assignee: Check Point Software Technologies, Ltd., Tel-Aviv (IL)

( * ) Notice: Subject to any disclaimer, the term of this patent is extended or adjusted under 35 U.S.C. 154(b) by 1565 days.

(21) Appl. No.: 12/056,462

(22) Filed: Mar. 27, 2008

(65) Prior Publication Data

US 2009/0249466 A1 Oct. 1, 2009

(51) Int. Cl.
*H04L 29/06* (2006.01)

(52) U.S. Cl.
USPC .......................................................... 726/13

(58) Field of Classification Search
USPC ..................................................... 726/12, 13
See application file for complete search history.

(56) References Cited

U.S. PATENT DOCUMENTS

| | | | | |
|---|---|---|---|---|
| 6,389,532 | B1 * | 5/2002 | Gupta et al. .................. | 713/163 |
| 7,139,679 | B1 | 11/2006 | McGrew | |
| 2003/0204728 | A1 * | 10/2003 | Irwin ............................ | 713/176 |
| 2004/0193876 | A1 * | 9/2004 | Donley et al. ................. | 713/162 |
| 2005/0216730 | A1 * | 9/2005 | Morino et al. ................ | 713/153 |
| 2007/0143598 | A1 | 6/2007 | Partridge et al. | |
| 2007/0255947 | A1 * | 11/2007 | Choudhury et al. .......... | 713/161 |
| 2008/0075079 | A1 * | 3/2008 | Smith ............................ | 370/392 |
| 2008/0133909 | A1 * | 6/2008 | You et al. ...................... | 713/161 |
| 2010/0322238 | A1 * | 12/2010 | Denis-Courmont et al. . | 370/389 |

FOREIGN PATENT DOCUMENTS

EP 1463265 9/2004

OTHER PUBLICATIONS

Paterson et al "A Cryptographic tour of the IPsec Standards". Information Security Technical Report. Elsevier Advanced Technology, vol. 11, No. 2., Jan. 1, 2006, pp. 72-81, XPO25173950.

* cited by examiner

*Primary Examiner* — Matthew Smithers
(74) *Attorney, Agent, or Firm* — Mark M. Friedman

(57) ABSTRACT

Disclosed are methods, devices, and media for enforcing network access control, the method including the steps of: extracting a packet signature from a packet (or packet fragment) received from a network; storing the packet signature and the packet in a buffer; computing a buffer signature using a per-endpoint secret key; determining whether the packet signature and the buffer signature are identical; and upon determining the packet signature and the buffer signature are identical, transmitting the packet to a protocol stack. Preferably, the step of extracting includes extracting the packet signature from a field (e.g. identification field) of a header of the packet. Preferably, the method further includes the step of: upon determining the packet signature and the buffer signature are not identical, discarding the packet. Methods for receiving a packet from a protocol stack, and transmitting the packet to a network are disclosed as well.

51 Claims, 4 Drawing Sheets

METHODS AND DEVICES FOR ENFORCING NETWORK ACCESS CONTROL UTILIZING SECURE PACKET TAGGING

FIELD AND BACKGROUND OF THE INVENTION

The present invention relates to methods and devices for enforcing network access control (NAC) utilizing secure packet tagging.

In recent years, security has become an increasing concern in information systems. This issue has become more significant with the advent of the Internet and the ubiquitous use of network environments (e.g. LAN and WAN). An important area of IT security is ensuring that only authorized and well-secured machines are allowed access into a local network. This area is known as Network Access Control or NAC.

Methods for tagging packets, outside of the realm of NAC, have primarily enabled endpoints to authenticate themselves to IPS (intrusion prevention system) devices during penetration testing. Such methods only tag for endpoint-to-IPS traffic, as opposed to tagging all traffic (e.g. endpoint-to-gateway, gateway-to-endpoint, and endpoint-to-endpoint). Such prior-art tagging methods are global (i.e. there is no identification of the endpoints), and do not solve problems that arise from packet fragmentation.

It would be desirable to have methods and devices for enforcing NAC utilizing secure packet tagging. Such methods and devices would, among other things, overcome the limitations of the prior art as described above by tagging between an endpoint and a gateway (or between two secure endpoints), providing the properties of traffic authentication and integrity protection.

SUMMARY OF THE INVENTION

It is the purpose of the present invention to provide methods and devices for enforcing NAC utilizing secure packet tagging.

Preferred embodiments of the present invention teach methods and devices for signing an IP (Internet protocol) packet to authenticate the identity of the sender to the receiver, and to protect the packet's integrity. Such methods and devices allow a sender and a receiver to maintain a secure connection, ensuring that the sender remains the same for the duration of the communication session, and is indeed the one whose identity has been authenticated (and whose compliance with a security policy has been demonstrated previously).

Preferred embodiments of the present invention teach methods and devices that utilize a rarely-used field in the IP-packet header, the identification field. In such embodiments, when an endpoint (i.e. sender or receiver) negotiates a shared secret key with the gateway, a secure hash using: (1) a previously-negotiated secret key, (2) the packet payload (i.e. everything except for the IP-packet header), (3) the IP protocol (e.g. UDP and TCP), and (4) the destination IP address is computed. Such a secure hash is truncated into 16 bits, and sent in the identification field. The receiver performs the hash-calculation process using the same secret key, and only accepts the packet if the included hash value matches the one the receiver has computed. The secure hash algorithm, one example of which is HMAC-SHA-1, is also negotiated in advance in a similar manner as with the secret key.

In preferred embodiments of the present invention, when a fragmented packet is received, the field must be identical for all fragments in order to comply with the IP protocol. In such embodiments, the system collects all fragments on the sender side, computes the hash for the concatenation of the fragments, and then transmits the fragments with an identical identification field, containing the computed hash. On the receiver side, such fragments need to be collected (i.e. "reassembled") before the receiver can validate the hash. The receiver verifies the correctness of the identification field in each received packet, and drops packets that are tagged incorrectly.

Since the tagged identification field is relatively short (i.e. 16 bits), it is easy for a rogue sender to fake a correctly-tagged packet by sending a large number of packets with a random identification field. In preferred embodiments of the present invention, the receiver can protect itself against such brute-force attacks by detecting sequences of packets with an incorrect tag, and blocking the sender of such packets.

Highly-secure packet-signing is possible (e.g. using the IPsec protocols: ESP, or AH). But such solutions modify the form of the packets. This prevents the use of typical IPS/IDS (intrusion detection system) devices, application-level routers, load balancers, and other in-line devices. Preferred embodiments of the present invention provide a significant level of protection against IP-spoofing attacks while keeping LAN traffic intact.

Therefore, according to the present invention, there is provided for the first time a method for enforcing network access control, the method including the steps of: (a) extracting a packet signature from a packet received from a network; (b) storing the packet signature and the packet in a buffer; (c) computing a buffer signature using a per-endpoint secret key; (d) determining whether the packet signature and the buffer signature are identical; and (e) upon determining the packet signature and the buffer signature are identical, transmitting the packet to a protocol stack.

Preferably, the step of extracting includes extracting the packet signature from a field of a header of the packet.

Most preferably, the field is an identification field.

Preferably, the method further includes the step of: (f) upon determining the packet signature and the buffer signature are not identical, discarding the packet.

Preferably, the packet is a packet fragment.

Most preferably, the method further includes the steps of: (f) prior to the step of computing, determining whether the packet fragment is a last fragment in a fragmented packet; (g) upon determining the packet fragment is the last fragment, performing the steps (c)-(e).

Most preferably, the method further includes the steps of: (f) prior to the step of computing, determining whether the packet fragment is a last fragment in a fragmented packet; (g) upon determining the packet fragment is not the last fragment, storing a next fragment in the buffer; (h) iteratively performing the steps (f)-(g); and (i) upon determining the packet fragment is the last fragment, performing the steps (c)-(e).

Preferably, the packet is a valid, unencrypted IP packet having a packet length equal to an original length of the packet.

According to the present invention, there is provided for the first time a method for enforcing network access control, the method including the steps of: (a) storing a packet, received from a protocol stack, in a buffer; (b) computing a packet signature using a per-endpoint secret key; (c) embedding the packet signature into the packet; and (d) transmitting the packet to a network.

Preferably, the step of embedding includes embedding the packet signature into a field of a header of the packet.

Most preferably, the field is an identification field.

Preferably, the packet is a packet fragment.

Most preferably, the method further includes the steps of: (e) prior to the step of computing, determining whether the packet fragment is a last fragment in a fragmented packet; (f) upon determining the packet fragment is the last fragment, performing the steps (b)-(d).

Most preferably, the method further includes the steps of: (e) prior to the step of computing, determining whether the packet fragment is a last fragment in a fragmented packet; (f) upon determining the packet fragment is not the last fragment, storing a next fragment in the buffer; (g) iteratively performing the steps (e)-(f); and (h) upon determining the packet fragment is the last fragment, performing the steps (b)-(d).

Preferably, the packet is a valid, unencrypted IP packet having a packet length equal to an original length of the packet.

According to the present invention, there is provided for the first time a device for enforcing network access control, the device including: (a) a gateway configured for: (i) extracting a packet signature from a packet received from a network; (ii) storing the packet signature and the packet in a buffer; (iii) computing a buffer signature using a per-endpoint secret key; (iv) determining whether the packet signature and the buffer signature are identical; and (v) upon determining the packet signature and the buffer signature are identical, transmitting the packet to a protocol stack.

Preferably, the extracting includes extracting the packet signature from a field of a header of the packet.

Most preferably, the field is an identification field.

Preferably, the gateway is further configured for: (vi) upon determining the packet signature and the buffer signature are not identical, discarding the packet.

Preferably, the packet is a packet fragment.

Most preferably, the gateway is further configured for: (vi) prior to the computing, determining whether the packet fragment is a last fragment in a fragmented packet; (vii) upon determining the packet fragment is the last fragment, performing the steps (iii)-(v).

Most preferably, the gateway is further configured for: (vi) prior to the computing, determining whether the packet fragment is a last fragment in a fragmented packet; (vii) upon determining the packet fragment is not the last fragment, storing a next fragment in the buffer; (viii) iteratively performing the steps (vi)-(vii); and (ix) upon determining the packet fragment is the last fragment, performing the steps (iii)-(v).

Preferably, the packet is a valid, unencrypted IP packet having a packet length equal to an original length of the packet.

According to the present invention, there is provided for the first time a device for enforcing network access control, the device including: (a) a gateway configured for: (i) storing a packet, received from a protocol stack, in a buffer; (ii) computing a packet signature using a per-endpoint secret key; (iii) embedding the packet signature into the packet; and (iv) transmitting the packet to a network.

Preferably, the embedding includes embedding the packet signature into a field of a header of the packet.

Most preferably, the field is an identification field.

Preferably, the packet is a packet fragment.

Most preferably, the gateway is further configured for: (v) prior to the computing, determining whether the packet fragment is a last fragment in a fragmented packet; (vi) upon determining the packet fragment is the last fragment, performing the steps (ii)-(iv).

Most preferably, the gateway is further configured for: (v) prior to the computing, determining whether the packet fragment is a last fragment in a fragmented packet; (vi) upon determining the packet fragment is not the last fragment, storing a next fragment in the buffer; (vii) iteratively performing the steps (v)-(vi); and (viii) upon determining the packet fragment is the last fragment, performing the steps (ii)-(iv).

Preferably, the packet is a valid, unencrypted IP packet having an a packet length equal to an original length of the packet.

According to the present invention, there is provided for the first time a computer-readable storage medium having computer-readable code embodied on the computer-readable storage medium, the computer-readable code including: (a) program code for extracting a packet signature from a packet received from a network; (b) program code for storing the packet signature and the packet in a buffer; (c) program code for computing a buffer signature using a per-endpoint secret key; (d) program code for determining whether the packet signature and the buffer signature are identical; and (e) program code for, upon determining the packet signature and the buffer signature are identical, transmitting the packet to a protocol stack.

Preferably, the program code for extracting includes extracting the packet signature from a field of a header of the packet.

Most preferably, the field is an identification field.

Preferably, the computer-readable code further includes: (f) program code for, upon determining the packet signature and the buffer signature are not identical, discarding the packet.

Preferably, the packet is a packet fragment.

Most preferably, the computer-readable code further includes: (f) program code for, prior to the computing, determining whether the packet fragment is a last fragment in a fragmented packet; (g) program code for, upon determining the packet fragment is the last fragment, executing the program code of the steps (c)-(e).

Most preferably, the computer-readable code further includes: (f) program code for, prior to the computing, determining whether the packet fragment is a last fragment in a fragmented packet; (g) program code for, upon determining the packet fragment is not the last fragment, storing a next fragment in the buffer; (h) iteratively executing the program code of the steps (f)-(g); and (i) program code for, upon determining the packet fragment is the last fragment, executing the program code of the steps (c)-(e).

Preferably, the packet is a valid, unencrypted IP packet having a packet length equal to an original length of the packet.

According to the present invention, there is provided for the first time a computer-readable storage medium having computer-readable code embodied on the computer-readable storage medium, the computer-readable code including: (a) program code for storing a packet, received from a protocol stack, in a buffer; (b) program code for computing a packet signature using a per-endpoint secret key; (c) program code for embedding the packet signature into the packet; and (d) program code for transmitting the packet to a network.

Preferably, the program code for embedding includes embedding the packet signature into a field of a header of the packet.

Most preferably, the field is an identification field.

Preferably, the packet is a packet fragment.

Most preferably, the computer-readable code further includes: (e) program code for, prior to the computing, determining whether the packet fragment is a last fragment in a fragmented packet; (f) program code for, upon determining the packet fragment is the last fragment, executing the program code of the steps (b)-(d).

Most preferably, the computer-readable code further comprising: (e) program code for, prior to the computing, determining whether the packet fragment is a last fragment in a fragmented packet; (f) program code for, upon determining the packet fragment is not the last fragment, storing a next fragment in the buffer; (g) program code for iteratively executing the program code of the steps (e)-(f); and (h) program code for, upon determining the packet fragment is the last fragment, executing the program code of the steps (b)-(d).

Preferably, the packet is a valid, unencrypted IP packet having a packet length equal to an original length of the packet.

These and further embodiments will be apparent from the detailed description and examples that follow.

BRIEF DESCRIPTION OF THE DRAWINGS

The present invention is herein described, by way of example only, with reference to the accompanying drawings, wherein.

DESCRIPTION OF THE PREFERRED EMBODIMENTS

The present invention relates to methods and devices for enforcing NAC utilizing secure packet tagging. The principles and operation for enforcing NAC utilizing secure packet tagging, according to the present invention, may be better understood with reference to the accompanying description and the drawings.

Figure 1:
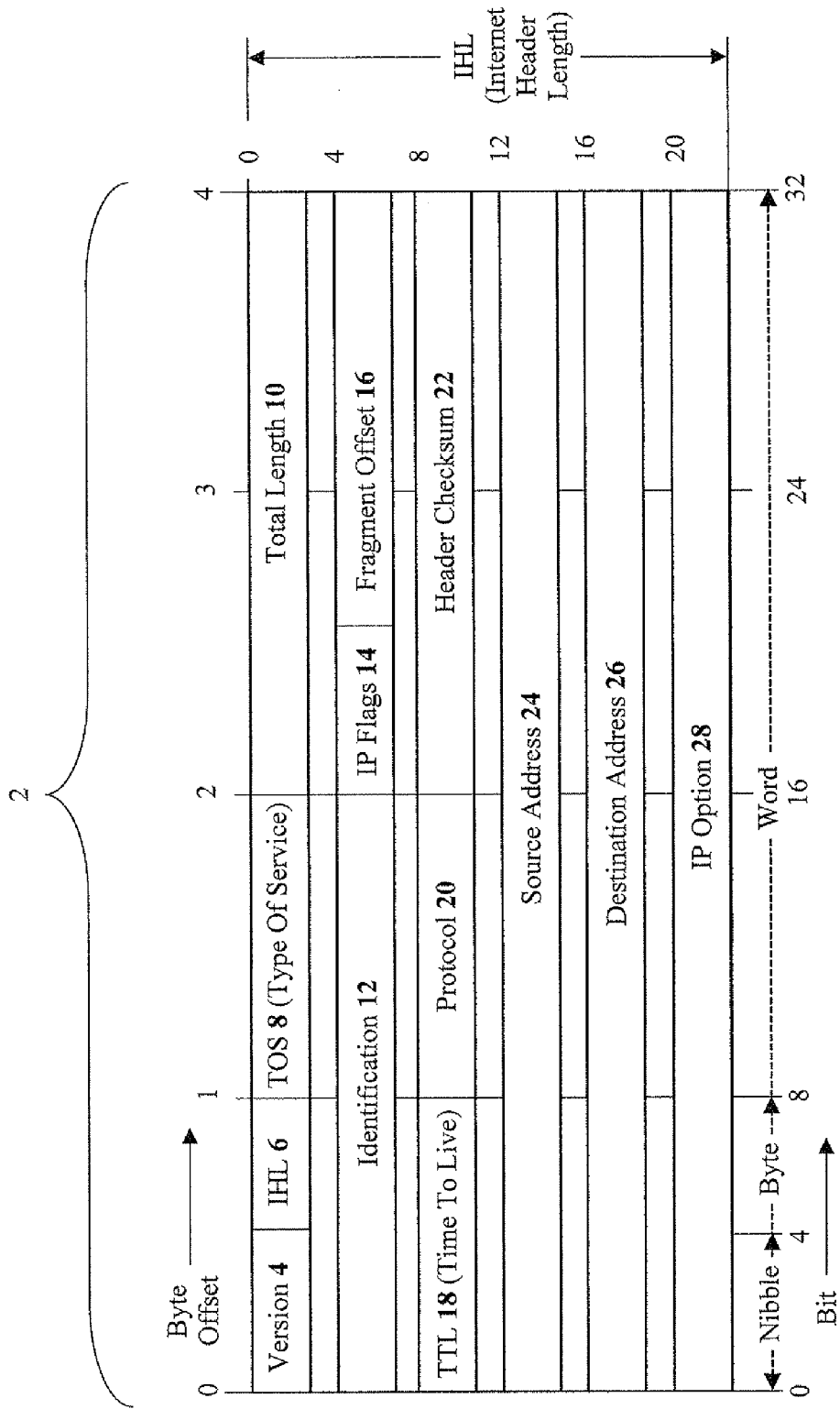
FIG. 1 shows the format of the field blocks of a typical IP-packet header, according to the prior art.

Referring now to the drawings, FIG. 1 shows the format of the field blocks of a typical IP-packet header, according to the prior art. An IP-packet header 2 is shown in FIG. 1 having various fields including: a version field 4, an IHL field 6 (Internet header length), a TOS field 8 (type of service), a total-length field 10, an identification field 12, an IP-flags field 14 (e.g. x, D, and M), a fragment-offset field 16, a TTL field 18 (time to live), a protocol field 20, a header-checksum field 22, a source-address field 24, a destination-address field 26, and an IP-option field 28 (an optional field that is not common).

The field position is indicated in FIG. 1 by an upper, horizontal, byte-offset axis. IHL is indicated in FIG. 1 by the right-side vertical axis. The field size (e.g. nibble, byte, word) is indicated in FIG. 1 by a lower, horizontal, bit axis.

In preferred embodiments of the present invention, identification field 12 of IP-packet header 2 is used to tag the IP packet. In such embodiments, when an endpoint (i.e. sender or receiver) negotiates a shared secret key with the gateway, a secure hash using: (1) a previously-negotiated secret key, (2) the packet payload (i.e. everything except for IP-packet header 2), (3) IP protocol field 20 (e.g. UDP and TCP), and (4) destination-address field 26 is computed. Such a secure hash is truncated into 16 bits, and sent in identification field 12. The receiver performs the hash-calculation process using the same secret key, and only accepts the packet if the included hash value matches the one the receiver has computed. The secure hash algorithm, one example of which is HMAC-SHA-1, is also negotiated in advance in a similar manner as with the secret key. It is noted that IP-packet header 2 can be associated with a packet that is a valid, unencrypted IP packet with no change to its original packet length. The only change to the original packet is in identification field 12.

Figure 2:
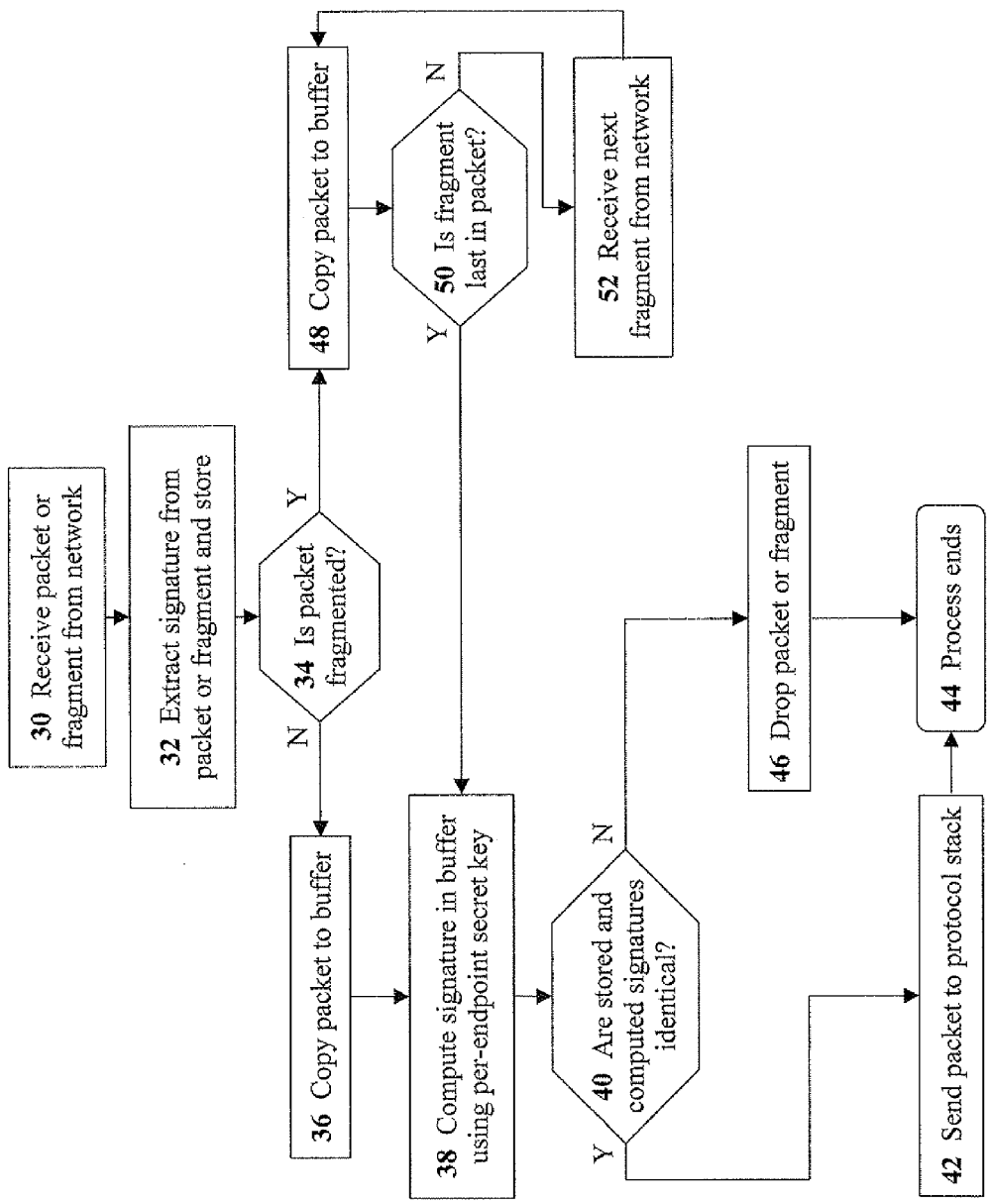
FIG. 2 is a simplified flowchart of a packet-tagging receiver procedure for packets or fragments received from a network, according to preferred embodiments of the present invention.

FIG. 2 is a simplified flowchart of a packet-tagging receiver procedure for packets or fragments received from a network, according to preferred embodiments of the present invention. The process starts when a packet or fragment is received from a network (Step 30). A signature (e.g. located in identification field 12) is extracted from the packet or fragment, and stored (Step 32). The system then determines whether the packet is fragmented (Step 34).

If the packet is not fragmented, the system copies the packet to a buffer (Step 36), and computes the signature in the buffer using a per-endpoint secret key (Step 38). The system then determines whether the stored and computed signatures are identical (Step 40). If the signatures are identical, then the system sends the packet to the protocol stack (Step 42), and the process comes to an end (Step 44). If the signatures are not identical in Step 40, then the system drops the packet or fragment (Step 46), and the process comes to an end (Step 44).

If the packet is fragmented in Step 34, the system copies the packet to a buffer (Step 48), and then determines whether the fragment is the last fragment in the packet (Step 50). If the fragment is the last fragment in the packet, then the process continues with Steps 38 and 40, and then either Steps 42 and 44, or Steps 46 and 44 as described above. If the fragment is not the last fragment in the packet in Step 50, then the system receives the next fragment from the network (Step 52). Then, the process continues with Steps 48 and 50 until all fragments have been processed, resumes the process above with Steps 38 and 40, and then either Steps 42 and 44, or Steps 46 and 44 as described above.

Figure 3:
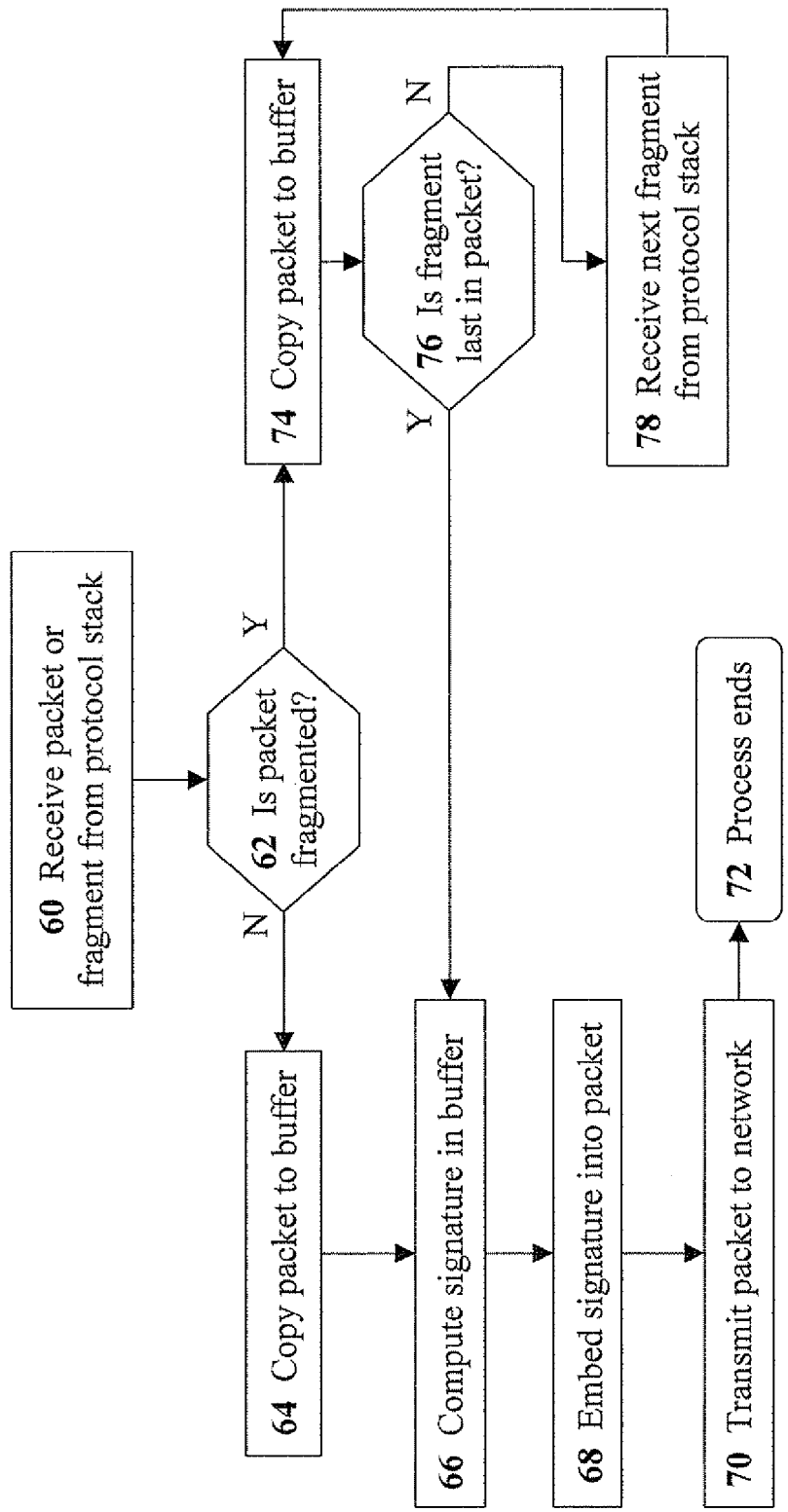
FIG. 3 is a simplified flowchart of a packet-tagging sender procedure for packets or fragments received from a protocol stack, according to preferred embodiments of the present invention.

FIG. 3 is a simplified flowchart of a packet-tagging sender procedure for packets or fragments received from a protocol stack, according to preferred embodiments of the present invention. The process starts when a packet or fragment is received from a protocol stack (Step 60). The system determines whether the packet is fragmented (Step 62). If the packet is not fragmented, the system copies the packet to a buffer (Step 64), and computes the signature in the buffer using a per-endpoint secret key (Step 66). The system then embeds the signature into the packet or fragment (e.g. into identification field 12) (Step 68). The packet or fragment is then transmitted to a network (Step 70), and the process comes to an end (Step 72).

If the packet is fragmented in Step 62, the system copies the packet to a buffer (Step 74), and then determines whether the fragment is the last fragment in the packet (Step 76). If the fragment is the last fragment in the packet, then the process continues with Steps 66, 68, 70, and 72 as described above. If the fragment is not the last fragment in the packet in Step 76, then the system receives the next fragment from the protocol stack (Step 78), and then the process continues with Steps 74 and 76 until all fragments have been processed.

Figure 4:
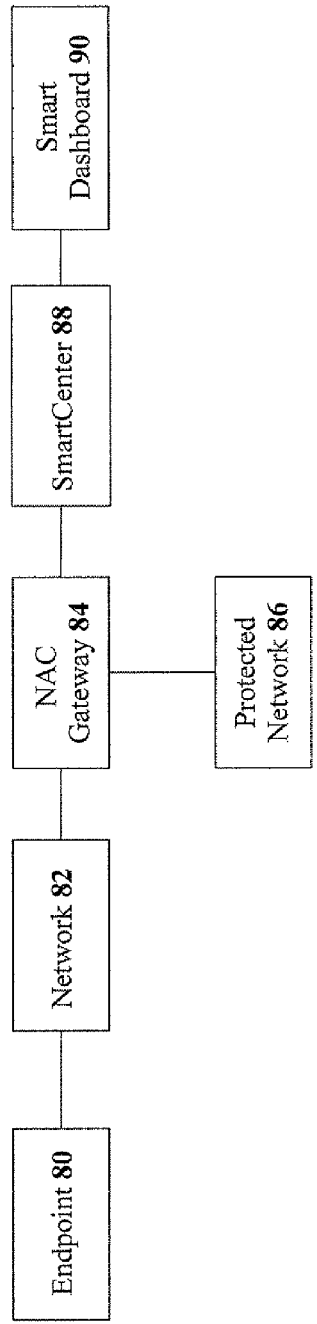
FIG. 4 is a simplified schematic block diagram of a packet-tagging system implemented in a typical endpoint-to-gateway network-architecture configuration, according to preferred embodiments of the present invention.

FIG. 4 is a simplified schematic block diagram of a packet-tagging system implemented in a typical endpoint-to-gateway network-architecture configuration, according to preferred embodiments of the present invention. An endpoint 80 (e.g. client system or server) is shown operationally connected to a network 82. Network 82 is shown operationally connected to an NAC gateway 84 (also known as a policy enforcement point, PEP). NAC gateway 84 (e.g. a server) protects any servers residing on a protected network 86 by allowing only duly-authenticated endpoints to communicate with the protected servers.

NAC gateway 84 is also operationally connected to security management servers. In preferred embodiments of the present invention, such servers are known as SmartCenter 88 and Smart Dashboard 90. Specifically, Smart Dashboard 90 is a graphical management console, and SmartCenter 88 is a security management server, is which stores and distributes the management configuration (and typically includes a policy decision point, PDP). SmartCenter 88 and Smart Dashboard 90 determine the access-control policy.

Figure 5:
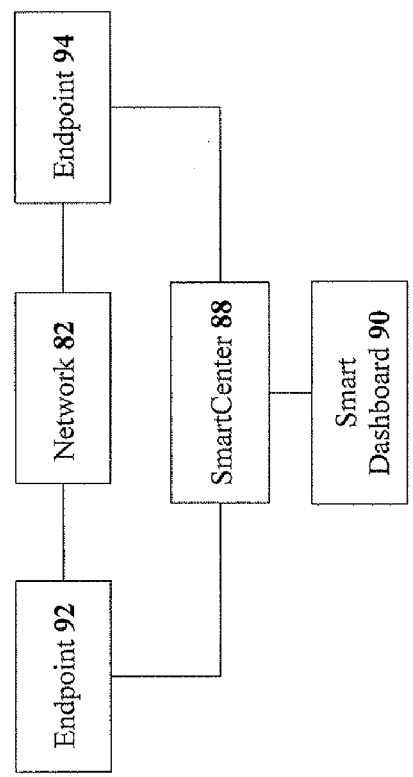
FIG. 5 is a simplified schematic block diagram of a packet-tagging system implemented in a typical endpoint-to-endpoint network-architecture configuration, according to preferred embodiments of the present invention.

FIG. 5 is a simplified schematic block diagram of a packet-tagging system implemented in a typical endpoint-to-endpoint network-architecture configuration, according to preferred embodiments of the present invention. Endpoints 92 and 94 are shown operationally connected to each other via network 82 (e.g. a LAN). Endpoints 92 and 94 both communicate with the PDP embedded in SmartCenter 88 to regulate NAC for network packets.

While the invention has been described with respect to a limited number of embodiments, it will be appreciated that many variations, modifications, and other applications of the invention may be made.

What is claimed is:

1. A method for enforcing network access control, the method comprising the steps of: for every packet fragment received from a network:
   (a) extracting a packet signature from said packet fragment;
   (b) storing said packet signature and said packet fragment in a buffer;
   (c) determining whether said packet fragment is a last fragment in a fragmented packet; and
   (d) if said packet fragment is said last fragment:
      (i) computing a local signature using a per-endpoint secret key,
      (ii) comparing said packet signature to said local signature to determine whether said packet signature and said local signature are identical, and
      (iii) only if said packet signature and said local signature are identical: transmitting said packet, of which said packet fragment is said last fragment, to a protocol stack;
   wherein said computing of said local signature is based at least in part on at least a portion of contents of a payload of said packet.

2. The method of claim 1, wherein said step of extracting includes extracting said packet signature from a field of a header of said packet.

3. The method of claim 2, wherein said field is an identification field.

4. The method of claim 1, the method further comprising the step of:
   (e) upon determining said packet signature and said local signature are not identical, discarding said packet.

5. The method of claim 1, wherein said packet is a valid, unencrypted IP packet having a packet length equal to an original length of said packet.

6. The method of claim 1, wherein said local signature is computed, said packet signature and said local signature are compared, and said packet is transmitted if said packet signature and said local signature are identical, only if said packet fragment is said last fragment.

7. The method of claim 1, wherein said packet, of which said packet fragment is said last fragment, is transmitted to said protocol stack only if all said packet signatures of said packet, of which said packet fragment is said last fragment, are identical.

8. A method for enforcing network access control, the method comprising the steps of:
   (a) storing a packet fragment, received from a protocol stack, in a buffer;
   (b) determining whether said packet fragment is a last packet fragment in a fragmented packet; and
   (c) if said packet fragment is said last fragment:
      (i) computing a packet signature using a per-endpoint secret key,
      (ii) embedding said packet signature into each packet fragment of said fragmented packet, and
      (iii) transmitting said packet, of which said packet fragment is said last fragment, to a network;
   wherein said computing of said packet signature is based at least in part on at least a portion of contents of a payload of said packet.

9. The method of claim 8, wherein said step of embedding includes embedding said packet signature into a field of a header of said packet.

10. The method of claim 9, wherein said field is an identification field.

11. The method of claim 8, wherein said packet is a valid, unencrypted IP packet having a packet length equal to an original length of said packet.

12. The method of claim 8, wherein said computing, said embedding and said transmitting are effected only if said packet fragment is said last packet fragment.

13. A device for enforcing network access control, the device comprising:
   (a) a gateway configured for:
      (i) receiving a packet fragment from a network;
      (ii) extracting a packet signature from said packet;
      (iii) storing said packet signature and said packet fragment in a buffer;
      (iv) subsequent to said extracting and storing, determining whether said packet fragment is a last fragment in a fragmented packet; and
      (v) if said packet fragment is said last fragment:
         (A) computing a local signature using a per-endpoint secret key,
         (B) comparing said packet signature to said local signature to determine whether said packet signature and said local signature are identical, and
         (C) only if said packet signature and said local signature are identical: transmitting said packet, of which said packet fragment is said last fragment, to a protocol stack; and
   (b) said buffer;
   wherein said computing of said local signature is based at least in part on at least a portion of contents of a payload of said packet.

14. The device of claim 13, wherein said extracting includes extracting said packet signature from a field of a header of said packet.

15. The device of claim 14, wherein said field is an identification field.

16. The device of claim 13, wherein said gateway is further configured for:
(vii) upon determining said packet signature and said local signature are not identical, discarding said packet.

17. The device of claim 13, wherein said packet is a valid, unencrypted IP packet having a packet length equal to an original length of said packet.

18. The device of claim 13, wherein said local signature is computed, said packet signature and said local signature are compared, and said packet is transmitted if said packet signature and said local signature are identical, only if said packet fragment is said last fragment.

19. The device of claim 13, wherein said packet, of which said packet fragment is said last fragment, is transmitted to said protocol stack only if all said packet signatures of said packet, of which said packet fragment is said last fragment, are identical.

20. A device for enforcing network access control, the device comprising:
(a) a gateway configured for:
(i) storing a packet fragment, received from a protocol stack, in a buffer;
(ii) determining whether said packet fragment is a last fragment in a fragmented packet; and
(iii) if said packet fragment is said last fragment:
(A) computing a packet signature using a per-endpoint secret key,
(B) embedding said packet signature into each packet fragment of said fragmented packet, and
(C) transmitting said packet, of which said packet fragment is said last fragment, to a network; and
(b) said buffer;
wherein said computing of said packet signature is based at least in part on at least a portion of contents of a payload of said packet.

21. The device of claim 20, wherein said embedding includes embedding said packet signature into a field of a header of said packet.

22. The device of claim 21, wherein said field is an identification field.

23. The device of claim 20, wherein said packet is a valid, unencrypted IP packet having a packet length equal to an original length of said packet.

24. The device of claim 20, wherein said computing, said embedding and said transmitting are effected only if said packet fragment is said last packet fragment.

25. A non-transitory computer-readable storage medium having computer-readable code embodied on the computer-readable storage medium, the computer-readable code comprising program code for: for every packet fragment received from a network:
(a) extracting a packet signature from said packet fragment;
(b) storing said packet signature and said packet fragment in a buffer;
(c) determining whether said packet fragment is a last fragment in a fragmented packet; and
(d) if said fragment is said last fragment:
(i) computing a local signature using a per-endpoint secret key,
(ii) comparing said packet signature to said local signature to determine whether said packet signature and said local signature are identical, and
(iii) only if said packet signature and said local signature are identical: transmitting said packet, of which said packet fragment is said last fragment, to a protocol stack;
wherein said computing of said local signature is based at least in part on at least a portion of contents of a payload of said packet.

26. The storage medium of claim 25, wherein said program code for extracting includes extracting said packet signature from a field of a header of said packet.

27. The storage medium of claim 26, wherein said field is an identification field.

28. The storage medium of claim 25, the computer-readable code further comprising:
(e) program code for, upon determining said packet signature and said local signature are not identical, discarding said packet.

29. The storage medium of claim 25, wherein said packet is a valid, unencrypted IP packet having a packet length equal to an original length of said packet.

30. The non-transitory computer-readable storage medium of claim 25, wherein said local signature is computed, said packet signature and said local signature are compared, and said packet is transmitted if said packet signature and said local signature are identical, only if said packet fragment is said last fragment.

31. The non-transitory computer-readable storage medium of claim 25, wherein said packet, of which said packet fragment is said last fragment, is transmitted to said protocol stack only if all said packet signatures of said packet, of which said packet fragment is said last fragment, are identical.

32. A non-transitory computer-readable storage medium having computer-readable code embodied on the computer-readable storage medium, the computer-readable code comprising:
(a) program code for storing a packet fragment, received from a protocol stack, in a buffer;
(b) program code for determining whether said packet fragment is a last fragment in a fragmented packet; and
(c) program code for: if said packet fragment is said last fragment:
(i) computing a packet signature using a per-endpoint secret key,
(ii) embedding said packet signature into each packet fragment of said fragmented packet, and
(iii) transmitting said packet, of which said packet fragment is said last fragment, to a network;
wherein said computing of said packet signature is based at least in part on at least a portion of contents of a payload of said packet.

33. The storage medium of claim 32 wherein said program code for embedding includes embedding said packet signature into a field of a header of said packet.

34. The storage medium of claim 33, wherein said field is an identification field.

35. The storage medium of claim 32, wherein said packet is a valid, unencrypted IP packet having a packet length equal to an original length of said packet.

36. The non-transitory computer-readable storage medium of claim 32, wherein said computing, said embedding and said transmitting are effected only if said packet fragment is said last packet fragment.

37. A method for enforcing network access control, the method comprising the steps of: for every packet fragment received from a network:
(a) extracting a packet signature from said packet fragment;

(b) storing said packet signature and said packet fragment in a buffer;
(c) determining whether said packet fragment is a last fragment in a fragmented packet;
(d) if said packet fragment is said last fragment:
  (i) computing a local signature using a per-endpoint secret key,
  (ii) comparing said packet signature to said local signature to determine whether said packet signature and said local signature are identical,
  (iii) only if said packet signature and said local signature are identical: transmitting said packet, of which said packet fragment is said last fragment, to a protocol stack; and
(e) otherwise, storing a next fragment in said buffer;
wherein said computing of said local signature is based at least in part on at least a portion of contents of a payload of said packet.

38. The method of claim 37, wherein said local signature is computed, said packet signature and said local signature are compared, and said packet is transmitted if said packet signature and said local signature are identical, only if said packet fragment is said last fragment.

39. The method of claim 37, wherein said packet, of which said packet fragment is said last fragment, is transmitted to said protocol stack only if all said packet signatures of said packet, of which said packet fragment is said last fragment, are identical.

40. A method for enforcing network access control, the method comprising the steps of:
(a) storing a packet fragment, received from a protocol stack, in a buffer;
(b) determining whether said packet fragment is a last fragment in a fragmented packet;
(c) if said packet fragment is said last fragment:
  (i) computing a packet signature using a per-endpoint secret key,
  (ii) embedding said packet signature into each packet fragment of said fragmented packet, and
  (iii) transmitting said packet, of which said packet fragment is said last fragment, to a network; and
(d) otherwise, storing a next fragment in said buffer;
wherein said computing of said packet signature is based at least in part on at least a portion of contents of a payload of said packet.

41. The method of claim 40, wherein said computing, said embedding and said transmitting are effected only if said packet fragment is said last packet fragment.

42. A device for enforcing network access control, the device comprising:
(a) a gateway configured for:
  (i) receiving a packet fragment from a network;
  (ii) extracting a packet signature from said packet;
  (iii) storing said packet signature and said packet fragment in a buffer;
  (iv) subsequent to said extracting and storing, determining whether said packet fragment is a last fragment in a fragmented packet;
  (v) if said packet fragment is said last fragment:
    (A) computing a local signature using a per-endpoint secret key,
    (B) comparing said packet signature to said local signature to determine whether said packet signature and said local signature are identical, and
    (C) only if said packet signature and said local signature are identical: transmitting said packet, of which said packet fragment is said last fragment, to a protocol stack; and
  (vi) otherwise, storing a next fragment in said buffer; and
(b) said buffer;
wherein said computing of said local signature is based at least in part on at least a portion of contents of a payload of said packet.

43. The device of claim 42, wherein said local signature is computed, said packet signature and said local signature are compared, and said packet is transmitted if said packet signature and said local signature are identical, only if said packet fragment is said last fragment.

44. The device of claim 42, wherein said packet, of which said packet fragment is said last fragment, is transmitted to said protocol stack only if all said packet signatures of said packet, of which said packet fragment is said last fragment, are identical.

45. A device for enforcing network access control, the device comprising:
(a) a gateway configured for:
  (i) storing a packet fragment, received from a protocol stack, in a buffer;
  (ii) determining whether said packet fragment is a last fragment in a fragmented packet;
  (iii) only if said packet fragment is said last fragment:
    (A) computing a packet signature using a per-endpoint secret key,
    (B) embedding said packet signature into each packet fragment of said fragmented packet, and
  (iv) transmitting said packet, of which said packet fragment is said last fragment, to a network; and
  (iv) otherwise, storing a next fragment in said buffer; and
(b) said buffer;
wherein said computing of said packet signature is based at least in part on at least a portion of contents of a payload of said packet.

46. The device of claim 45, wherein said computing, said embedding and said transmitting are effected only if said packet fragment is said last packet fragment.

47. A non-transitory computer-readable storage medium having computer-readable code embodied on the computer-readable storage medium, the computer-readable code comprising program code for: for every packet fragment received from a network:
(a) extracting a packet signature from said packet fragment;
(b) storing said packet signature and said packet fragment in a buffer;
(c) determining whether said packet fragment is a last fragment in a fragmented packet; and
(d) if said packet fragment is said last fragment:
  (i) computing a local signature using a per-endpoint secret key,
  (ii) comparing said packet signature to said local signature to determine whether said packet signature and said local signature are identical, and
  (iii) only if said packet signature and said local signature are identical, transmitting said packet, of which said packet fragment is said last fragment, to a protocol stack; and
(e) otherwise, storing a next fragment in said buffer;
wherein said computing of said local signature is based at least in part on at least a portion of contents of a payload of said packet.

48. The non-transitory computer-readable storage medium of claim 47, wherein said local signature is computed, said packet signature and said local signature are compared, and said packet is transmitted if said packet signature and said local signature are identical, only if said packet fragment is said last fragment.

49. The non-transitory computer-readable storage medium of claim 47, wherein said packet, of which said packet fragment is said last fragment, is transmitted to said protocol stack only if all said packet signatures of said packet, of which said packet fragment is said last fragment, are identical.

50. A non-transitory computer-readable storage medium having computer-readable code embodied on the computer-readable storage medium, the computer-readable code comprising:
  (a) program code for storing a packet fragment, received from a protocol stack, in a buffer;
  (b) program code for determining whether said packet fragment is a last fragment in a fragmented packet; and
  (c) program code for:
    (i) if said packet fragment is said last fragment:
      (A) computing a packet signature using a per-endpoint secret key,
      (B) embedding said packet signature into each packet fragment of said fragmented packet, and
      (C) program code for transmitting said packet, of which said packet fragment is said last fragment, to a network; and
    (ii) otherwise, storing a next fragment in said buffer;
  wherein said computing of said packet signature is based at least in part on at least a portion of contents of a payload of said packet.

51. The non-transitory computer-readable storage medium of claim 50, wherein said computing, said embedding and said transmitting are effected only if said packet fragment is said last packet fragment.

\* \* \* \* \*